Patented Aug. 9, 1949

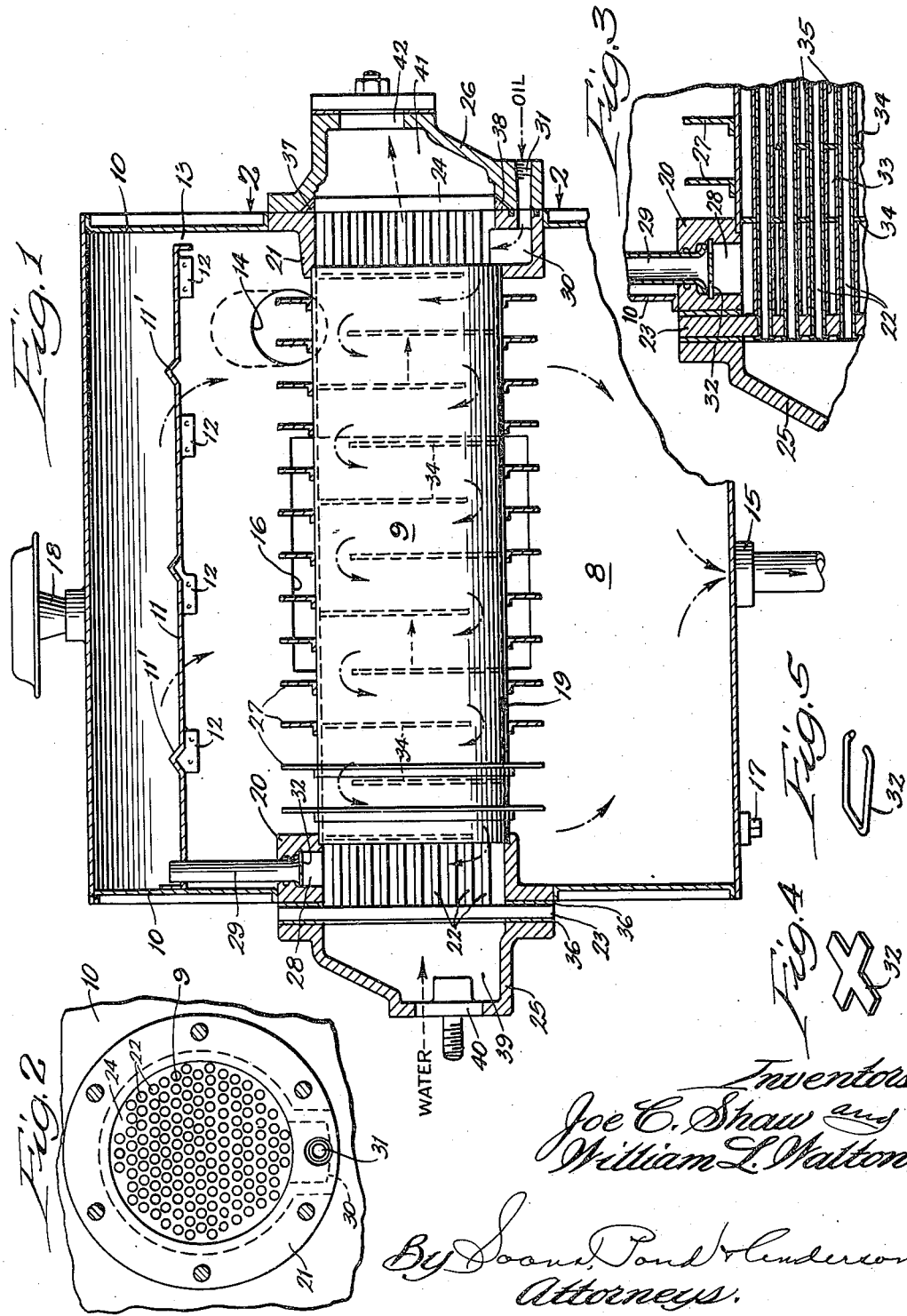

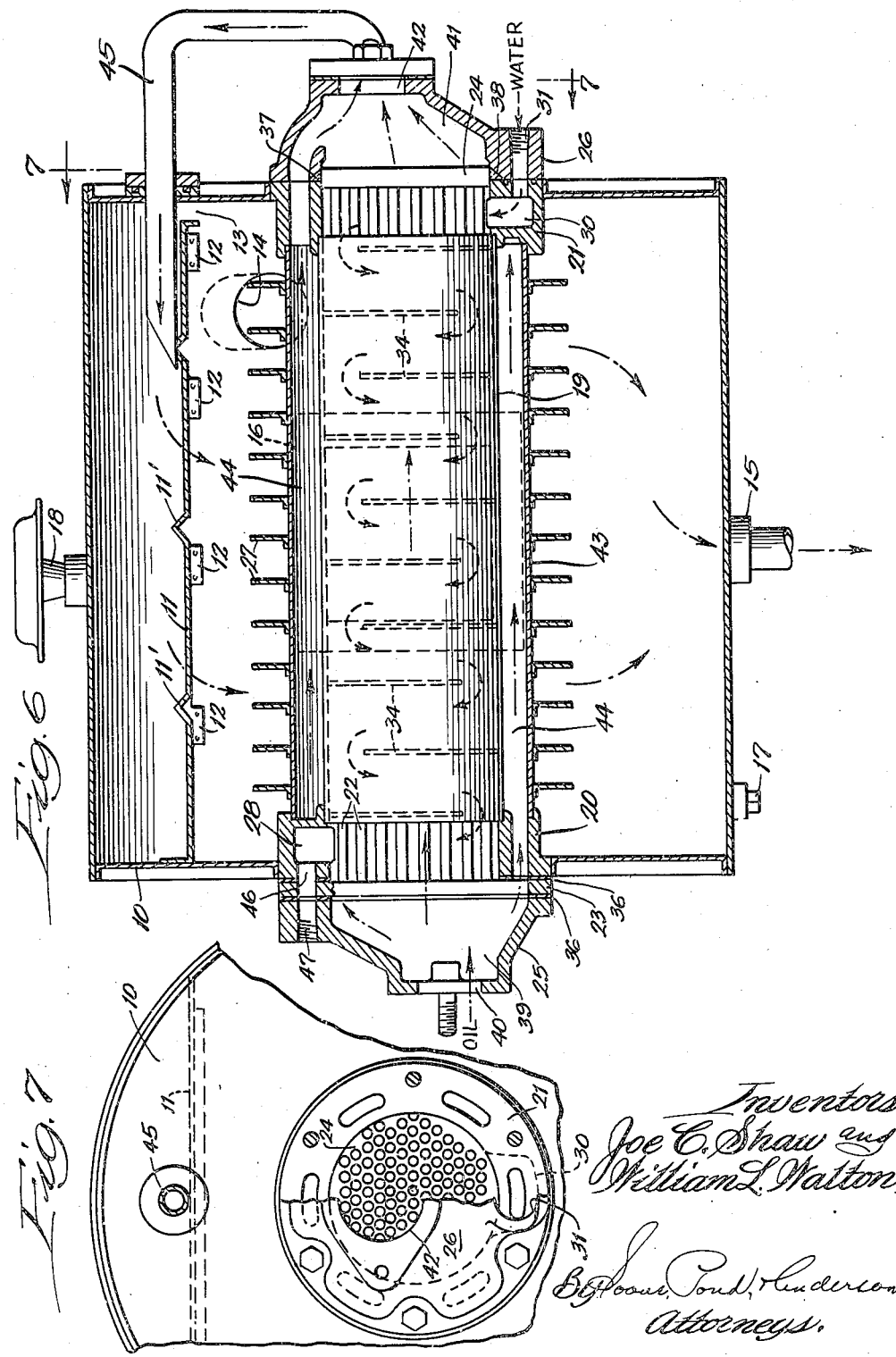

2,478,428

UNITED STATES PATENT OFFICE 2,478,428

DEAERATING AND COOLING DEVICE FOR HYDRAULIC TRANSMISSION FLUIDS

Joe C. Shaw and William L. Walton, Racine, Wis., assignors to Young Radiator Company, Racine, Wis., a corporation of Wisconsin Application April 25, 1947, Serial No. 743,884

6 Claims. (Cl. 183—2.5)

1

This invention relates to a heat-dissipating and deaerating device for hydraulic torque converters.

Increasingly hydraulic torque converters are being employed in automotive equipment. Especially is that true with highway vehicles of the heavy-duty type, and very particularly buses.

In view of the prospect of frequent if not continuous heavy loads for such equipment, provision has to be made for the dissipation of rather high temperatures and the removal of considerable air generated and churned into the fluid during the torque conversion process. Designers of equipment for freeing the fluid from such heat and air must take cognizance of the fact that in transport vehicles of this kind space is at a premium.

The main objects of this invention, therefore, are to provide an improved form and construction of a device for use in cooling and deaerating the fluid used in the hydraulic torque converters; to provide a device of this kind having an improved form of heat-transfer unit adapted for convenient and compact arrangement within an improved form of deaerating container; to provide an improved arrangement of conduits affording communication between the heat-dispersing element and the deaerating container; to provide an improved device of this kind the parts of which may be so connected that the torque converter fluid and the coolant will be caused to flow through either of the paths in said heat-transfer unit; and to provide an improved device of this kind particularly effective for use on automotive equipment of the heavy-duty type where high efficiency and compact construction are concurrent imperatives.

In the accompanying drawings,

Fig. 1 is a cross-sectional view of a preferred form of heat-dissipating and deaerating device embodying this invention;

Fig. 2 is a fragmentary end view of the same, taken from the right of Fig. 1 on the line 2—2;

Fig. 3 is an enlarged fragmentary detail showing the manner in which the baffles of the heat-exchange unit are spaced apart and also the manner whereby one end of an outlet conduit is secured in place on one of the fittings which support the shell of the heat-transfer unit;

Figs. 4 and 5 are perspective views of optional spring clips suitable for securing the aforesaid conduit in place;

Fig. 6 is a modified form of the device; and

Fig. 7 is a fragmentary end view of the same, taken from the left of Fig. 6 on the line 7—7.

A heat-dissipating and deaerating device embodying this invention comprises a deaerating tank or container 8, which serves as a storage supply of fluid required for the torque converter, and a heat-transfer unit 9 arranged within said tank and by means of which the heat generated in the fluid by the torque converter is dissipated.

The tank or container 8, as herein shown, is of cylindrical form, although it could be of some other geometrical shape. This tank is preferably of sheet metal construction provided with flanged ring-shaped ends 10 welded in place and which provide support for the heat-transfer unit 9, as will appear more fully hereinafter. A deaerating plate or partition 11 is arranged axially of the tank near the top thereof. It is secured in place by means of tabs 12 welded or otherwise bonded to the partition and to the sides of the tank and providing spaces 13 between the tank and the lateral edges and at the ends of the partition which permit oil delivered above the partition 11 to pass down into the tank. Corrugations 11' are formed in the partition 11 and serve to facilitate the deaerating process. A suitably capped inlet tube 14 is arranged on the tank above the normal level of oil therein. An outlet 15 on the bottom of the tank is connected to the torque converter.

At one side, the tank 8 is formed with a rectangular-shaped clean-out manhole 16 the cover for which may mount an oil gauge. A plugged drain 17 is formed at the bottom of the tank near the end 10. The tank is also arranged with a conventional type breather 18.

The heat-transfer unit 9, in the preferred embodiment, comprises a shell 19 mounted on and bonded to fittings 20 and 21, within which shell is arranged a battery of tubes 22. These tubes are bonded at their ends to header plates 23 and 24 and provide communication between the chambered fittings 25 and 26.

The shell 19 is preferably of thin sheet metal and has supported on the exterior thereof a plurality of heat-dissipating fins 27 of conventional form and arrangement.

The fittings 20 and 21 generally would be in the form of castings and are bonded in the ring-shaped tank-ends 10. In the preferred embodiment the casting 20 has an outlet 28 connected by a conduit 29 with the space above the tank partition 11. The fitting 21 is provided with an inlet 30 communicating with an inlet 31 in the fitting 26.

The conduit 29 is assembled on the fitting 20 by being inserted through the outlet port 28, prior to the placing of the battery of tubes 22 in the shell 19. The conduit is held in place by means of a spring retainer 32 of either of the types shown in Figs. 4 and 5.

The tubes 22 have their opposite ends bonded in the header plates 23 and 24. This may be done by any of the well-known methods of expansion, spinning, or welding. Being spaced apart, the tubes 22 provide a labyrinth 33 around them for the flow of fluid in heat-exchange relationship with a fluid flowing through the tubes 22. This labyrinth 33 communicates at its opposite ends with the outlet 28 in the fitting 20 and the inlet 30 in the fitting 21. Baffles 34 of a conventional type are radially arranged in the shell 19. The ends of adjacent baffles are spaced away from opposite sides of the shell 19, thus forming a tortuous path for the fluid flow through the labyrinth 33 and requiring the fluid to flow in a radial direction most of the time as it moves axially through the heat-transfer unit 9. The baffles 34 are held in proper spaced relationship by means of spacer sleeves 35 mounted on certain of the tubes 22, as most clearly shown in Fig. 3.

The header plate 23 is of a diameter approximately equal to the exterior diameter of the fittings 20 and 25 between which it is clamped. The header plate 24, on the other hand, is of a diameter sufficiently less than the interior diameter of the shell 19 to permit the core of the heat-transfer unit 9 to be telescopically inserted into or removed from the shell 19.

The fittings 25 and 26, like the fittings 20 and 21, are preferably castings. They are adapted to be bolted in the usual manner to the fittings 20 and 21 respectively. Gaskets 36 are inserted between the header plate 23 and the fittings 20 and 25 and a gasket ring 37 is set in the chamfer 38 to seal the juncture of the fittings 21 and 26 with each other and with the header plate 24.

The fitting 25 is formed with a chamber 39 by means of which the tubes 22 are connected with a fluid supply through the medium of an inlet port 40. Likewise the fitting 26 is formed with a chamber 41 by means of which the tubes 12 at their other ends are connected with a fluid outlet port 42. Generally these ports 40 and 42 are connected to the water cooling system for the engine which powers the vehicle.

The modification shown in Figs. 6 and 7 employs an auxiliary outer shell 43 concentrically arranged with respect to the main shell 19 and on which are supported the heat-dissipating fins 16. The fittings 20, 21, 25, and 26 are modified so as to provide communication with an annular space 44 between the shells 43 and 19 as well as through the tubes 12.

Fig. 6 also shows an additional modification of the structure which permits a reversal of flow paths of fluids whereby the coolant flows through the labyrinth 33 and the torque-converter fluid flows through the tubes. In such modification, a conduit 45 is connected to the outlet port 42 of the fitting 26 exteriorly of the tank 8 and extended in through the right-hand tank end 10 above the partition 11. The fitting 20 is modified so as to eliminate the radially-disposed opening for the conduit 29 but has an axial channel 46 connecting the outlet 28 with a similarly-disposed port 47 formed in a modified fitting 25.

The operation of the preferred form of heat-dissipating and deaerating device is as follows:

The torque converter fluid, preferably oil, comes directly from the torque converter in its highly heated and aerated condition and enters the labyrinth 33 through the ports 31 and 30. The oil flows through the labyrinth as indicated by the broken-line arrows in Fig. 1 and is discharged through the conduit 29 into the tank 8 above the partition 11. In its tortuous passage through the labyrinth 33, this oil has the heat thereof absorbed by the water passing through the tubes 12 as indicated by the dotted arrows in Fig. 1. This heat of the oil is practically dissipated by the time the oil is discharged into the space above the tank partition 11. However, as the oil emerges from the labyrinth it still retains much of the air churned into it during its passage through the torque converter. The discharge of this aerated oil through the conduit 29 onto the partition 11 causes it to spread out over the surface thereof. Reduced to a comparatively shallow stream, and of necessity flowing along the partition 11 up over the corrugations 11', affords the air an opportunity to escape into the top of the tank 8. The cooled and deaerated oil spills over the lateral edges and the end of the partition 11 into the space in the tank below the partition.

In the modification shown in Fig. 6 the heated oil from the torque converter enters the port 40 in the fitting 25 and flows through the tubes 22 and through the space 44 between the shells 19 and 43, and thence up through the conduit 45 to the space above the tank partition 11, as indicated by the broken line arrows in said figure. The coolant in this case enters through the inlet ports 26 and 21 and flows through the labyrinth 33 and thence out through the outlet ports 46 and 47.

Other variations and modifications in the details of structure and arrangement of the parts may be resorted to within the spirit and coverage of the appended claims.

We claim:

1. A device of the class described comprising, a fluid supply tank having a fluid outlet, an axially-disposed transverse partition arranged at one side of said tank remote from said outlet affording communication between opposite sides of said partition, a shell arranged within said tank in spaced relationship to said partition, a battery of tubes supported in said shell in spaced relationship to each other so as to provide a labyrinth around said tubes for the flow of fluid in heat-exchange relationship with a coolant flow through said tubes, fittings mounted on the ends of said tank for supporting said shell and having inlets and outlets communicating with said labyrinth and with said tubes, and a conduit connecting one of said outlets with the space above said tank partition.

2. A device of the class described comprising, a fluid supply tank having a fluid outlet, an axially-disposed transverse partition arranged at one side of said tank remote from said outlet and having portions of its perimeter spaced from the sides of said tank so as to afford communication between opposite sides of said partition, a shell arranged within said tank in spaced relationship to said partition, a battery of tubes supported in said shell in spaced relationship to each other so as to provide a labyrinth around said tubes for the flow of fluid in heat exchange relationship with a coolant flow through said tubes, fittings mounted on the ends of said tank for supporting said shell and having inlets and outlets communicating with said labyrinth and with said tubes, and a conduit connecting one of said outlets with the space above said tank partition.

3. A device of the class described comprising, a fluid supply tank having a fluid outlet, an axially-disposed transverse partition arranged at one side of said tank remote from said outlet and affording communication between opposite sides of said partition, a pair of concentrically positioned shells arranged within said tank in spaced relationship to said partition, a battery of tubes supported in the inner of said shells in spaced relationship to each other so as to provide a labyrinth around said tubes for the flow of fluid in heat exchange relationship with a coolant flow through said tubes, fittings mounted on said tank for supporting said shells and having an inlet and an outlet communicating with said labyrinth and another inlet and another outlet communicating with said tubes and the space between said shells, and a conduit connecting one of said fitting outlets with the space above said tank partition.

4. A device of the class described comprising, a fluid supply tank having a fluid outlet, an axially-disposed transverse partition arranged at one side of said tank remote from said outlet and affording communication between opposite sides of said partition, a shell arranged within said tank in spaced relationship to said partition, a battery of tubes supported in said shell in spaced relationship to each other so as to provide a labyrinth around said tubes for the flow of fluid in heat exchange relationship with a coolant flow through said tubes, fittings mounted on the ends of said tank for supporting said shell and having inlets and outlets communicating with said labyrinth and with said tubes, and a conduit located within said tank and connecting the outlet for said labyrinth with the space above said tank partition.

5. A device of the class described comprising, a fluid supply tank having a fluid outlet, an axially-disposed transverse partition arranged at one side of said tank remote from said outlet and affording communication between opposite sides of said partition, a shell arranged within said tank in spaced relationship to said partition, a battery of tubes supported in said shell in spaced relationship to each other so as to provide a labyrinth around said tubes for the flow of fluid in heat exchange relationship with a coolant flow through said tubes, fittings mounted on the ends of said tank for supporting said shell and having inlets and outlets communicating with said labyrinth and with said tubes, and a conduit connecting the fitting outlet communicating with said tubes with the space above said tank partition.

6. A device of the class described comprising, a fluid supply tank having a fluid outlet, an axially-disposed partition arranged at one side of said tank remote from said outlet and affording communication between opposite sides of said partition, heads for said tank, a fitting arranged in each of said tank heads, a shell spanning said fittings and secured at its ends thereto, a pair of tube headers one of a diameter not greater than the internal diameter of said shell, a battery of tubes spacing said headers apart substantially the distance between the outer faces of said fittings, said tubes having their ends anchored in the respective fittings with the tubes spaced apart to provide a labyrinth around said tubes for the flow of fluid in heat exchange relationship with a coolant flow through said tubes, a second fitting secured to each of said first-mentioned fittings and each provided with a chamber communicating with said tubes, each of said first-mentioned fittings having a port communicating with said labyrinth, each of said second-mentioned fittings having a port communicating with the respective chambers, and a conduit connecting one of the ports communicating with said labyrinth with the space above said tank partition.

JOE C. SHAW.
WM. L. WALTON.

REFERENCES CITED

The following references are of record in the file of this patent:

UNITED STATES PATENTS

| Number | Name | Date |
|---|---|---|
| 1,013,329 | Strohbach | Jan. 2, 1912 |
| 1,101,969 | Still | June 30, 1914 |
| 1,734,515 | Elliott | Nov. 5, 1929 |
| 2,223,688 | Jabelmann | Dec. 3, 1940 |
| 2,254,070 | Jacocks | Aug. 26, 1941 |